3,405,085
NON-FOAMING SYNTHETIC RESIN DISPERSIONS WITH PROLONGED STORABILITY
Friedrich Girg, Worsdorf, Taunus, Guido Max Rudolf Lorentz, Oes, Post Espa, and Gerhart Schultz, Frankfurt am Main, Germany, assignors to Farbwerke Hoechst Aktiengesellschaft vormals Meister Lucius & Bruning, Frankfurt am Main, Germany, a corporation of Germany
No Drawing. Continuation-in-part of application Ser. No. 399,377, Sept. 25, 1964. This application Mar. 13, 1967, Ser. No. 622,444
Claims priority, application Germany, Sept. 28, 1963, F 40,867
4 Claims. (Cl. 260—29.6)

ABSTRACT OF THE DISCLOSURE

Foaming of synthetic resin dispersions which contain emulsifiers is avoided by incorporating in the dispersions a mixture consisting of at least 2 glycol ethers which are non-ionic surfactants and which consist of the same or different hydrophobic radicals and must contain different molar proportions of ethylene oxide. The glycol ethers used are oxyethylated derivatives of alkyl phenols, fatty alcohols, fatty amines and fatty acids.

---

The present application is a continuation in part of copending application Ser. No. 399,377 now abandoned.

The present invention relates to a process for preparing synthetic resin dispersions which have been defoamed so as to be stable in storage and which are particularly suitable for use as plastifiers and sealing materials for concrete and mortar. The term synthetic resin dispersions is here meant to include dispersions of natural latices. By concrete and mortar are to be understood in this specification mixtures of cement and additives, the term mortar also comprising lime mortar and mortar of plaster that do not contain cement.

Owing to the chemical properties of the inorganic binders, concrete and mortar are susceptible to the action of corrosive substances. Besides, in their structure they contain pores, capillaries and cavities into and through which water may penetrate. The final strength and the resistance to abrasion of the hardened material are impaired by the fact that in order to render the material well workable more water than is necessary for its setting has to be added to it when the mixture is prepared.

It has been known to improve the plasticity of freshly mixed concrete and mortar by the addition of, for example, wetting agents, so that a smaller excess of water is required for the mixing while the workability is not impaired. This measure enables the material to be compressed more easily and more completely, so that structures are obtained which are compact and have a higher final strength. However, concrete or mortar which has thus been prepared is not yet impermeable to moisture and water.

It has also been known to render concrete and mortar impermeable to moisture and water by the addition of so-called sealing materials such as, for example, trass, slags, water glass, silicones, soaps or fatty acids. Additives of this kind pack the holes in concrete or mortar but they impair the final strength, in particular the compressive strength of the hardened material to a degree which is often considerable.

It is also known to use dispersions of synthetic resins as additives for concrete and mortar. Such dispersions are prepared by dispersing one or more suitable monomers in water while adding an emulsifier and polymerizing or copolymerizing the monomer or monomers in this state. The dispersions are added to the concrete or mortar when the batch is mixed and they bring about a plastification of the mixture. When the concrete or mortar sets the synthetic resin separates in the form of a solid mass which remains within the hardened material, in particular in the pores, capillaries and cavities, and fills and seals the cavities completely or to a large extent. When a suitable synthetic resin is used a homogeneous, solid final product is obtained which has a satisfactory density and a good resistance to chemical substances. Moreover, the workability of the fresh mixture and its adhesion to old material which has already hardened are improved.

A large number of synthetic resin dispersions which may be added to concrete or mortar have been known, for example, dispersions of polyvinyl chloride or polyvinylidene chloride or polyvinyl esters such as polyvinyl acetate or polyvinyl propionate, polyvinyl ethers, polystyrene, polyethylene, polypropylene, polybutadiene, polymethylbutadiene, polychlorobutadiene, polyethylene oxide, polyacrylic acid and its derivatives such as polymethacrylic acid, polyacrylic acid esters and polyacrylonitriles or natural latices.

There is also known a large variety of suitable emulsifiers. As examples of such emulsifiers the following anionic, cationic, non-ionic and high molecular surface-active compounds may be mentioned: As anionic compounds: salts of carboxylic acids, for example, fatty acids, aryl aminocarboxylic acids and alkyl sulfamidocarboxylic acids, salts of acid, sulfuric acid esters (sulfates), for examples sulfated oils, fats, fatty acids and the derivatives thereof, alkyl sulfates, sulfated fatty acid alkanolamides, sulfated polyglycol ether derivatives, salts of sulfonic acids (sulfonates), for example, alkyl sulfonates, condensation products of oxy- and amino-alkanol sulfonic acids, salts of alkyl sulfopolycarboxylic acid esters, alkyl aryl sulfonates and salts of alkyl aryl polyglycol ether sulfonates; as cationic compounds: salts of aliphatic amines and quaternary ammonium salts; as non-ionic compounds: fatty acid esters of polyalcohols, fatty acid alkanolamides, addition products of ethylene oxide, for example, polyglycols of fatty acids, polyglycol ethers of fatty acid esters, polyglycol ethers of fatty alcohols and mercaptanes, polyglycol ethers of acrylamides and fatty acid alkanolamides, polyglycol ethers of fatty amines, polyglycol ethers of alkyl aromatic substances, addition products of polypropylene oxide with ethylene oxide, secondary and tertiary phosphoric acid esters the alkyl or acyl groups of which are bound directly or via an ethylene oxide bridge to ortho-phosphoric acid; and as high molecular, surface-active compounds: polyvinyl alcohols, polyacrylates, polyvinyl pyrrolidone and polyvinyl pyridiene.

Synthetic resin dispersions of the aforesaid kind have the drawback of containing an emulsifier, which is, however, necessary to render them storable. When the concrete or mortar is mixed the emulsifier leads to the formation of foam and, consequently, to the introduction of air into the mixture, so that the final strength of the material does not attain the highest possible value.

In order to overcome that drawback defoaming agents are added to the emulsifier-containing synthetic resin dispersions. However, a defoaming agent can be added only at the site immediately before the concrete or mortar is mixed, since synthetic resin dispersions containing defoaming agents cannot be stored. All defoaming agents which have hitherto been known lose their effect after a short time of storage already. In certain cases the presence of a defoaming gaent may even lead to the breakdown of a dispersion.

Now we have found that foaming of synthetic resin dispersions which contain emulsifiers is avoided by incorporating in the dispersions a mixture of at least 2 glycol ethers which consist of an oxyethylated hydrophobic radical, the hydrophobic radical of the glycol ethers to be added to the dispersions being the same or different and the degree of oxyethylation being different. The mixtures of such glycol ethers which will be referred to as defoaming agents are incorporated in the dispersions in an amount between 2.5 and 20% by weight, the amount being calculated on the solids content of the dispersion.

Special examples of defoaming agents according to the invention are mixtures of oxyethylated castor oil containing 9 mols of ethylene oxide and oxyethylated castor oil containing 3 mols of ethylene oxide; mixtures of oxyethylated alkyl phenols, e.g. a mixture of oxyethylated tributyl phenol containing 4 mols of ethylene oxide and oxyethylated nonyl phenol containing 6 mols of ethylene oxide; mixtures of oxyethylated oleic acid containing 2 mols of ethylene oxide and oxyethylated nonyl phenol containing 6 mols of ethylene oxide. Further advantageous mixtures will be shown in the accompanying tables.

The quantity in which the additive is to be used has to be adapted in every case by a preliminary test to the kind and quantity of the emulsifier contained in the synthetic resin dispersion.

Synthetic resin dispersions which contain the additive according to the invention show a reduced introduction of air pores in mixtures of concrete or mortar. In some cases the introduction of air pores is even less than in mixtures of concrete or mortar that do not contain an additive. Owing to the additive according to the invention the final strength is considerably increased as compared to that of mixtures with foaming synthetic resin dispersions. The adhesiveness to old material that has already been hardened, the resistance to water and to aggressive substances and the plastifying effect on the concrete or mortar are also improved. It is surprising that the plastifying effect is improved since the plasification has hitherto been ascribed to the introduction of air pores.

It will be apparent from the tables herein that a wide variety of synthetic resin dispersions containing emulsifiers of widely differing chemical nature can be successfully defoamed with the agents of the invention. As regards the composition of the defoaming agent to be added reference should be had to Table 1.

Table 2 shows by one example that the defoaming action is not impaired by long time storage even at an elevated temperature. The example equally shows that neither is impaired the storability of the dispersion.

TABLE 1.—SYNTHETIC RESIN DISPERSIONS AS ADDITIVES FOR CONCRETE AND MORTAR

In all the experiments a mixture of sand and cement having the following composition was used: 1.00 part by weight of Portland cement 275, 3.00 parts by weight of additive having a grain size of 0 to 3 millimeters and 0.55 part by weight of mixing water.
The mixture was mixed in a laboratory mixer slowly for 1 minute, quickly for 1 minute and slowly for 1 minute.
The water contained in the dispersions was substracted from the water used for the preparation of the mixture. The quantities of dispersion added are calculated as 100% solids on the cement. The quantities of defoaming agent added are calculated on the solids content of the dispersion.

| 1 | 2 | 3 | 4 | 5 | 6 | 7 | 8 |
|---|---|---|---|---|---|---|---|
| No. | Composition of the dispersion to be examined | Solids content, percent | Quantity and kind of emulsifier | Quantity of dispersion added, percent | Quantity and composition of the defoaming agent | Extension in centimeters | Content of air in percent by volume |
|  |  |  |  |  |  | 17.5/17.8 | 4.2 |
| 1 | Copolymer of butyl acrylate/methyl methacrylate/acrylic acid (55:44:1) adjusted to a pH of 8.5 by means of NH₄OH. | 47 | 3% of nonyl phenol polyglycol ether containing 30 mols of ethylene oxide. | 2.5 | 15% of a mixture of— 4 parts by weight of castor oil containing 9 mols of ethylene oxide and 1 part by weight of castor oil containing 3 mols of ethylene oxide. | 18.5/18.6 | 4.5 |
| 2 | Copolymer of vinyl chloride/butyl acrylate/acrylic acid (54:43:3), adjusted to a pH of 7 by means of triethanol amine. | (¹) | 3% of sodium lauryl sulfate | 2.5 2.5 | 10% of a mixture of— 3 parts by weight of tributyl phenol polyglycol ether containing 4 mols of ethylene oxide and 2 parts by weight of nonyl phenol polyglycol ether containing 6 mols of ethylene oxide. | 16.2/16.3 24.0/23.5 | 16.0 7.0 |
| 3 | Polymer of vinyl acetate | 50 | 5% of polyvinyl alcohol | 2.5 10 2.5 |  10% of a mixture of— 2 parts by weight of oleic acid containing 2 mols of ethylene oxide and 3 parts by weight of nonyl phenol polyglycol ether containing 6 mols of ethylene oxide. | 19.5/19.6 23.0/23.1 20.5/20.4 | 16.0 14.0 3.2 |
|  |  |  |  | 2.5 | 12% of a mixture of— 1 part by weight of oleyl alcohol containing 4 mols of ethylene oxide and 1 part by weight of oleyl amine containing 2 to 3 mols of ethylene oxide. | 22.3/22.0 | 7.0 |
|  |  |  |  | 10 | 5% of a mixture of— 2 parts by weight of oleic acid containing 2 mols of ethylene oxide and 3 parts by weight of nonyl phenol polyglycol ether containing 6 mols of ethylene oxide. | 24.7/25.0 | 1.0 |
|  |  |  |  | 10 | 5% of a mixture of— 1 part by weight of oleyl alcohol containing 4 mols of ethylene oxide and 1 part by weight of oleyl amine containing 2 to 3 mols of ethylene oxide. | 24.4/24.2 | 5.0 |

TABLE 1—Continued

| No. | Composition of the dispersion to be examined | Solids content, percent | Quantity and kind of emulsifier | Quantity of dispersion added, percent | Quantity and composition of the defoaming agent | Extension in centimeters | Content of air in percent by volume |
|---|---|---|---|---|---|---|---|
| 4 | Polymer of vinyl acetate | 50 | 1% of the sodium salt of ethene sulfonic acid. 2% of the sodium salt of dodecyl sulfonic acid. | 2.5 10 2.5 | — — 10% of a mixture of — 2 parts by weight of oleic acid containing 2 mols of ethylene oxide and 3 parts by weight of nonyl phenol polyglycol ether containing 6 mols of ethylene oxide. | 16.8/16.8 13.2/13.1 23.0/23.2 | 51.2 16.8 3.9 |
|  |  |  |  | 2.5 | 12% of a mixture of— 1 part by weight of oleyl amine containing 2 to 3 mols of ethylene oxide and 1 part by weight of oleyl alcohol containing 4 mols of ethylene oxide. | 23.9/24.1 | 6.5 |
|  |  |  |  | 10 | 5% of a mixture of— 2 parts by weight of oleic acid containing 2 mols of ethylene oxide and 2 parts by weight of nonyl phenol polyglycol ether containing 6 mols of ethylene oxide. | 27.0/27.4 | 6.5 |
|  |  |  |  | 10 | 5% of a mixture of— 1 part by weight of oleyl amine containing 2 to 3 mols of ethylene oxide and 1 part by weight of oleyl alcohol containing 4 mols of ethylene oxide. | >30 | 6.5 |
| 5 | Natural latex | 50 | Based on albumin | 2.5 2.5 | — 20% of a mixture of— 2 parts by weight of oleic acid containing 2 mols of ethylene oxide and 3 parts by weight of nonyl phenol polyglycol ether containing 6 mols of ethylene oxide. | 17.3/17.5 22.0/22.3 | 21.0 9.0 |

In the following experiments a lime mortar comprising 1 part by weight of white lime hydrate, 3 parts by weight of additive (grain size up to 3 millimeters) and 0.9 part by weight of mixing water was used instead of the cement mortar used in the preceding experiments.

| Composition of the dispersion under test | Solids content, percent | Quantity and kind of emulsifier (quantity calculated on monomer used) | Quantity of dispersion added (100% solids), percent | Quantity and composition of defoaming agent (quantity calculated on the dry mass of synthetic resin present in the dispersion) | Extension in centimeters | Content of air in percent by volume |
|---|---|---|---|---|---|---|
| Copolymer of butyl acrylate/ methyl methacrylate/acrylic acid (40:59:1) adjusted to a pH of about 8.5 by means of NH₄OH. | 47 | 3% of nonyl phenol polyglycol ether containing 30 mols of ethylene oxide. | 2.5 2.5 | — 10% of a mixture of— 2 parts by weight of oleic acid containing 2 mols of ethylene oxide and 3 parts by weight of nonyl phenol polyglycol ether containing 6 mols of ethylene oxide. | 17.2/17.3 18.7/18.8 19.4/19.5 | 2.0 12.0 3.5 |

¹ About 35 percent.

TABLE 2.—STORABILITY FOR A PROLONGED PERIOD OF THE DE-FOAMED DISPERSIONS

The experiments were carried through with the use of a mortar having the following composition: 1 part by weight of Portland cement, 3 parts by weight of additives, 0.5 part by weight of mixing water.

| Composition of the dispersion to be examined | Solids content, percent | Quantity and kind of emulsifier | Quantity of dispersion added, percent | Quantity and composition of defoaming agent | Values measured at the beginning of storage | | Values measured after a storage of 4 months at— | | | |
|---|---|---|---|---|---|---|---|---|---|---|
|  |  |  |  |  |  |  | 20° C. | | 60° C. | |
|  |  |  |  |  | Extension in centimeters | Content of air in percent by volume | Extension in centimeters | Content of air in percent by volume | Extension in centimeters | Content of air in percent by volume |
| Copolymer of butyl acrylate/ methyl methacrylate/acrylic acid (55:44:1) adjusted to a pH of 8.5 by means of NH₄OH. | 47 | 3% of nonyl phenol polyglycol ether containing 30 mols of ethylene oxide. | 2.5 2.5 | — 15% of a mixture of— 4 parts by weight of castor oil containing 9 mols of ethylene oxide and 1 part by weight of castor oil containing 3 mols of ethylene oxide. | 17.5/17.8 18.7/18.9 18.6/18.8 | 3.6 15.2 4.5 | 17.4/17.2 17.9/18.0 18.8/18.9 | 4.2 16.6 4.9 | 17.4/17.2 18.0/18.7 18.5/18.7 | 4.2 15.4 4.8 |

We claim:

1. A composition of matter consisting of an aqueous dispersion of a synthetic resin, an emulsifier, and a defoaming agent, in which composition the defoaming agent is between about 2.5 to 20% by weight on basis of the solids content of the dispersion and is a mixture of at least two oxyethylated compounds selected from the group consisting of (1) oxyethylated oleyl amine with 2 to 3 mols of ethylene oxide per mole and oxyethylated oleyl alcohol with 4 mols of ethylene oxide per mol; (2) oxyethylated alkyl phenol selected from the group consisting of (a) nonyl phenol with 6 to 30 mols of ethylene oxide per mol and (b) oxyethylated tributyl phenol with 4 to 7 mols of ethylene oxide per mol and oxyethylated oleic acid with 2 mols of ethylene oxide per mol; and (3) oxyethylated castor oil with 9 mols of ethylene oxide per mol and oxyethylated castor oil with 3 mols of ethylene oxide per mol.

2. The composition of claim 1, in which the defoaming agent is a mixture of even parts by weight of oxyethylated oleyl amine with 2 to 3 mols of ethylene oxide per mol and oxyethylated oleyl alcohol with 4 mols of ethylene oxide per mol.

3. The composition of claim 1, in which the defoaming agent is a mixture of 1 to 3 parts by weight of an oxyethylated alkyl phenol selected from the group consisting of nonyl phenol with 6 to 30 mols of ethylene oxide per mol, oxyethylated tributyl phenol with 4 to 7 mols of ethylene oxide per mol and 1 to 2 parts by weight of oxyethylated oleic acid with 2 mols of ethylene oxide per mol.

4. The composition of claim 1, in which the defoaming agent is a mixture of 4 parts by weight of oxyethylated castor oil with 9 mols of ethylene oxide per mol and 1 part by weight of oxyethylated castor oil with 3 mols of ethylene oxide per mol.

References Cited

UNITED STATES PATENTS

| | | | |
|---|---|---|---|
| 2,773,041 | 12/1956 | Larsen et al. | 260—29.6 |
| 2,947,715 | 8/1960 | Charlet et al. | 260—17 |

MURRAY TILLMAN, *Primary Examiner.*

J. L. WHITE, *Assistant Examiner.*